(12) United States Patent
Nomura et al.

(10) Patent No.: US 8,505,407 B2
(45) Date of Patent: Aug. 13, 2013

(54) STEERING COLUMN DEVICE

(75) Inventors: Tetsuo Nomura, Maebashi (JP); Jun Yamada, Maebashi (JP)

(73) Assignee: NSK Ltd., Shinagwa-ku, Tokyo (JP)

( * ) Notice: Subject to any disclaimer, the term of this patent is extended or adjusted under 35 U.S.C. 154(b) by 1045 days.

(21) Appl. No.: 11/658,548

(22) PCT Filed: Jul. 15, 2005

(86) PCT No.: PCT/JP2005/013124
§ 371 (c)(1),
(2), (4) Date: Sep. 17, 2009

(87) PCT Pub. No.: WO2006/011378
PCT Pub. Date: Feb. 2, 2006

(65) Prior Publication Data
US 2010/0000366 A1    Jan. 7, 2010

(30) Foreign Application Priority Data

Jul. 27, 2004  (JP) ................................. 2004-218558

(51) Int. Cl.
*B62D 1/18* (2006.01)
(52) U.S. Cl.
USPC ........................................... 74/493; 280/775
(58) Field of Classification Search
USPC ............ 74/492, 493; 280/775, 777; 403/371
See application file for complete search history.

(56) References Cited

U.S. PATENT DOCUMENTS

| 3,686,906 | A | | 8/1972 | Watkins et al. ................. 70/252 |
| 4,091,977 | A | * | 5/1978 | Luttbeg ....................... 206/315.4 |
| 5,193,930 | A | * | 3/1993 | Chi ................................. 403/24 |
| 5,664,806 | A | | 9/1997 | Vortmeyer et al. ........... 280/777 |
| 6,406,410 | B1 | * | 6/2002 | Lochbaum .................... 482/111 |
| 6,467,807 | B2 | * | 10/2002 | Ikeda et al. ................... 280/775 |

(Continued)

FOREIGN PATENT DOCUMENTS

| EP | 0 611 690 A1 | 8/1994 |
| EP | 1 640 241 A1 | 3/2006 |

(Continued)

OTHER PUBLICATIONS

International Notification Concerning Transmittal of International Preliminary Report on Patentability dated Feb. 8, 2007, for counterpart PCT Application No. PCT/JP2005/013124 (5 pages).

(Continued)

*Primary Examiner* — Alan Waits
(74) *Attorney, Agent, or Firm* — Crowell & Moring LLP

(57) ABSTRACT

A steering column device where an inner column can be reliably clamped and sufficient rigidity and strength of an outer column can be achieved. A semi-circular arc rib (132) is formed on the peripheral edge of a closed end section (131) of a slit (13). The rib (132) is substantially semi-circular are-shaped and projects outward from an outer peripheral surface (15A) of an outer column (1). Further, linear ribs (133A, 133B) extend linearly toward the vehicle body front side so as to be continuous from the vehicle body front side of the semi-circular arc rib (132). The semi-circular arc rib (132) and the linear ribs (133A, 133B) reinforce the peripheral edge of the slit (13) of the outer column (1) whose rigidity and strength are impaired. Thus the rigidity and strength of the outer column (1) are improved.

7 Claims, 18 Drawing Sheets

(56) References Cited

U.S. PATENT DOCUMENTS

| | | | |
|---|---|---|---|
| 6,983,118 B2* | 1/2006 | Jaskowiak et al. | 399/330 |
| 2002/0059847 A1* | 5/2002 | Green et al. | 74/492 |
| 2003/0000330 A1* | 1/2003 | Murakami et al. | 74/492 |
| 2005/0093283 A1* | 5/2005 | Yamada | 280/775 |
| 2008/0087129 A1* | 4/2008 | Kaneko et al. | 74/493 |

FOREIGN PATENT DOCUMENTS

| | | |
|---|---|---|
| JP | 9-2293 A | 1/1997 |
| JP | 2002-46625 A | 2/2002 |
| JP | 2002-59848 A | 2/2002 |
| JP | 2003-2211 A | 1/2003 |
| JP | 2003-306152 A | 10/2003 |
| JP | 2004-1751 A | 1/2004 |

OTHER PUBLICATIONS

International Notification of Transmittal of Translation of the International Preliminary Report on Patentability dated Feb. 8, 2007, for counterpart PCT Application No. PCT/JP2005/013124 (5 pages).
Supplementary European Search Report dated Nov. 22, 2007, for counterpart European Application No. EP 05 76 6301.
WO 2006/011378 A1, concerning International Application No. PCT/JP2005/013124, cites the following documents in the order they appear in the International Search Report (ISR) (with an English-language translation thereof).

* cited by examiner

FIG. 23
(1)
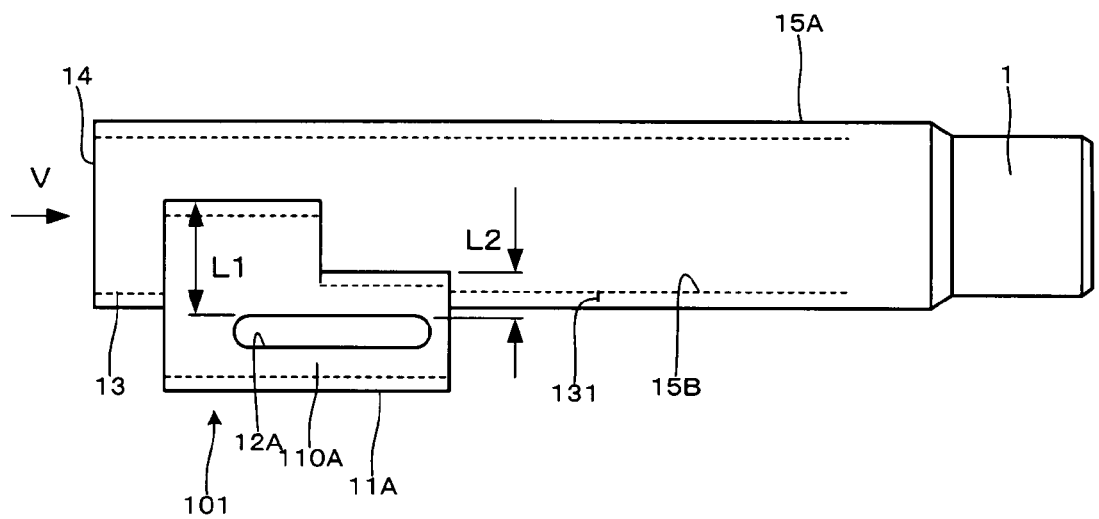
(2)
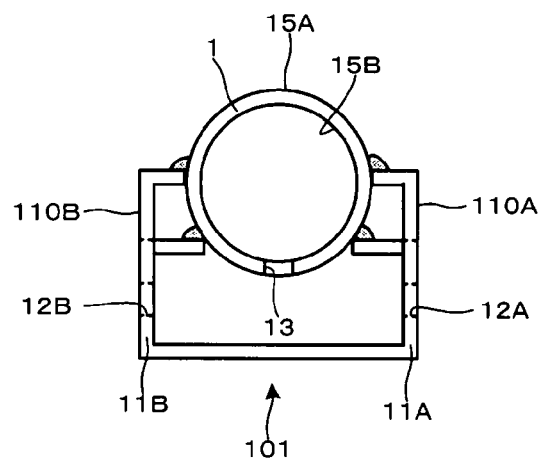

STEERING COLUMN DEVICE

RELATED APPLICATIONS

This application is a National Stage of International Application No. PCT/JP2005/013,124, filed Jul. 15, 2005, which is based on Japanese Patent Application No. 2004-218,558 filed with Japanese Patent Office on Jul. 27, 2004, the entire content of which is incorporated herein by reference.

TECHNICAL FIELD

The present invention relates to a steering column device, particularly, one which adjusts a telescopic position of a steering wheel using an outer column and an inner column axially slidably fitted together and which, at a time of secondary collision, moves by collapsing so as to absorb a shock load.

BACKGROUND ART

A steering column device has been known in which an outer column and an inner column are axially slidably fitted together allowing a telescopic position to be adjusted and, at a time of secondary collision, a shock load to be absorbed. Generally, in such a steering column device, an axial slit is formed in the outer column; and the outer column is clamped from its outer periphery causing the outer column to be elastically deformed in its slit portion, so that, when the vehicle is in normal operation, the inner column is clamped to be unmovable relative to the outer column (Patent Document 1).

Whereas such a steering column device having a slit formed in an outer column is advantageous in that the outer column can be elastically deformed in its slit portion with ease to securely clamp an inner column, it has a problem that the slit decreases the rigidity and strength of the outer column itself. Particularly, in cases where the steering column device has a structure which allows a steering lock device to be attached to the outer column, the rigidity of steering locking by the steering lock device becomes inadequate.

Patent Document 1: Japanese Unexamined Patent Publication No. 2003-2211

DISCLOSURE OF THE INVENTION

Problem to be Solved by the Invention

An object of the present invention is to provide a steering column device which can securely clamp an inner column while securing required rigidity and strength of an outer column.

Means for Solving the Problem

The above object can be achieved by the following means. Namely, a first invention provides a steering column device which comprises an inner column, a hollow cylindrical outer column axially relatively movably fitted over the inner column, a slit formed, over a prescribed axial length, in the outer column, and a clamping device which axially relatively unmovably clamps the inner column to the outer column by radially contracting the outer column. The steering column device is characterized in that a reinforcement part is provided at least at a peripheral edge of an end section of the slit formed in the outer column.

A second invention provides the steering column device of the first invention characterized in that one axial end of the slit is open to an end face of the outer column.

A third invention provides the steering column device of the first or second invention, characterized in that the reinforcement part is a closed end section of the slit, the closed end section being wider than the other portion of the slit.

A fourth invention provides the steering column device of the first or second invention, characterized in that the reinforcement part is a closed end section of the slit, the closed end section being thicker than the other portion of the slit.

A fifth invention provides the steering column device of the first or second invention, characterized in that, on an outer periphery of the outer column, a rib is formed at least in a range where the slit is formed, the rib being substantially in parallel with the slit.

A sixth invention provides the steering column device of the fifth invention, characterized in that a plurality of the ribs are formed at angularly spaced-apart positions on the outer periphery of the outer column.

A seventh invention provides the steering column device of the first or second invention, characterized in that the outer column is formed by die-casting.

An eighth invention provides the steering column device of the first or second invention, characterized in that a steering lock device to lock a steering wheel is attached to at least one of the outer column and the inner column.

A ninth invention provides a steering column device, comprising an inner column, a hollow cylindrical outer column axially relatively movably fitted over the inner column, a slit formed, over a prescribed axial length, in the outer column, and a clamping device which axially relatively unmovably clamps the inner column to the outer column by radially contracting the outer column. The steering column device is characterized in that a closed end section which is not open to an axial end face of the outer column is formed at each axial end of the slit.

A tenth invention provides the steering column device of the ninth invention, characterized in that a cut perpendicular to the slit is formed in at least one of the closed end sections.

An eleventh invention provides a steering column device which comprises a body side upper bracket mountable on a vehicle body, an inner column, a hollow cylindrical outer column which is fitted over the inner column such that a telescopic position of the outer column is axially adjustable and which is axially supported by the body side upper bracket, a slit formed, over a prescribed axial length, in the outer column, and a clamping device which can axially relatively unmovably clamp the inner column to the outer column by clamping, with side plates of the body side upper bracket, a clamp portion formed on the outer column and thereby causing the outer column to be elastically deformed and radially contracted in its slit portion. The steering column device is characterized in that a contact area between the side plates of the body side upper bracket and the clamp portion is changed according to the telescopic position of the outer column.

A twelfth invention provides the steering column device of the eleventh invention, characterized in that the distance between the contact area and the slit is increased for a range of the telescopic position where the outer column can be elastically deformed with ease.

A thirteenth invention provides the steering column device of the eleventh or twelfth invention, characterized in that a closed end section which is not open to an axial end face of the outer column is formed at each axial end of the slit, and in that a cut perpendicular to the slit is formed in at least one of the closed end sections.

Effect of the Invention

In a steering column device according to the present invention, a reinforcement part formed at a peripheral edge of a slit formed in an outer column, while increasing the rigidity and strength of the outer column, makes it possible to elastically deform with ease the outer column in its slit portion and securely clamp an inner column. In a case where the steering lock device has a structure which can include a steering lock device, the strength of steering locking by the steering lock device increases.

In a steering column device according to the present invention, both ends of a slit are closed, and a cut is formed in at least one of the closed end sections of the slit. Therefore, the variation in the force required to operate an operation lever is small, and the force required to elastically deform an outer column is also small. As a result, the force required to operate the operation lever can be held small.

Furthermore, in a steering column device according to the present invention, a contact area between side plates of a body side upper bracket and a clamp portion of an outer column is changed according to a telescopic position of the outer column, thereby changing the bending moment applied to the clamp portion. This makes it possible to reduce the difference in the force required to elastically deform the outer column in its slit portion between when the telescopic position is toward the vehicle front and when the telescopic position is toward the vehicle rear.

BRIEF DESCRIPTION OF THE DRAWINGS

FIG. 9(1) is a bottom view equivalent to FIG. 6 of the first embodiment. FIG. 9(2) is a cross-sectional view taken along line C-C in FIG. 9(1).

FIG. 10 is equivalent to FIG. 6 showing the first embodiment.

FIG. 11(1) is a bottom view which is equivalent to FIG. 6 showing the first embodiment. FIG. 11(2) is a cross-sectional view taken along line D-D in FIG. 11(1). FIG. 11(3) shows modification to FIGS. 11(1) and 11(2), and is equivalent to a cross-sectional view taken along line D-D in FIG. 11(1).

FIG. 12 is equivalent to FIG. 6 showing the first embodiment.

FIG. 13 is equivalent to FIG. 5 showing the first embodiment.

FIG. 14 is equivalent to FIG. 6 showing the first embodiment.

FIG. 15 is equivalent to FIG. 5 showing the first embodiment.

FIG. 16 is equivalent to FIG. 6 showing the first embodiment.

FIGS. 17(1) to 17(4) are equivalent to a view on arrow T in FIG. 15.

FIGS. 23(1) and 23(2) show an outer column alone of a steering column device according to an eleventh embodiment of the present invention, FIG. 23(1) being a side view and FIG. 23(2) being a view on arrow V in FIG. 23(1).

Figure 1:
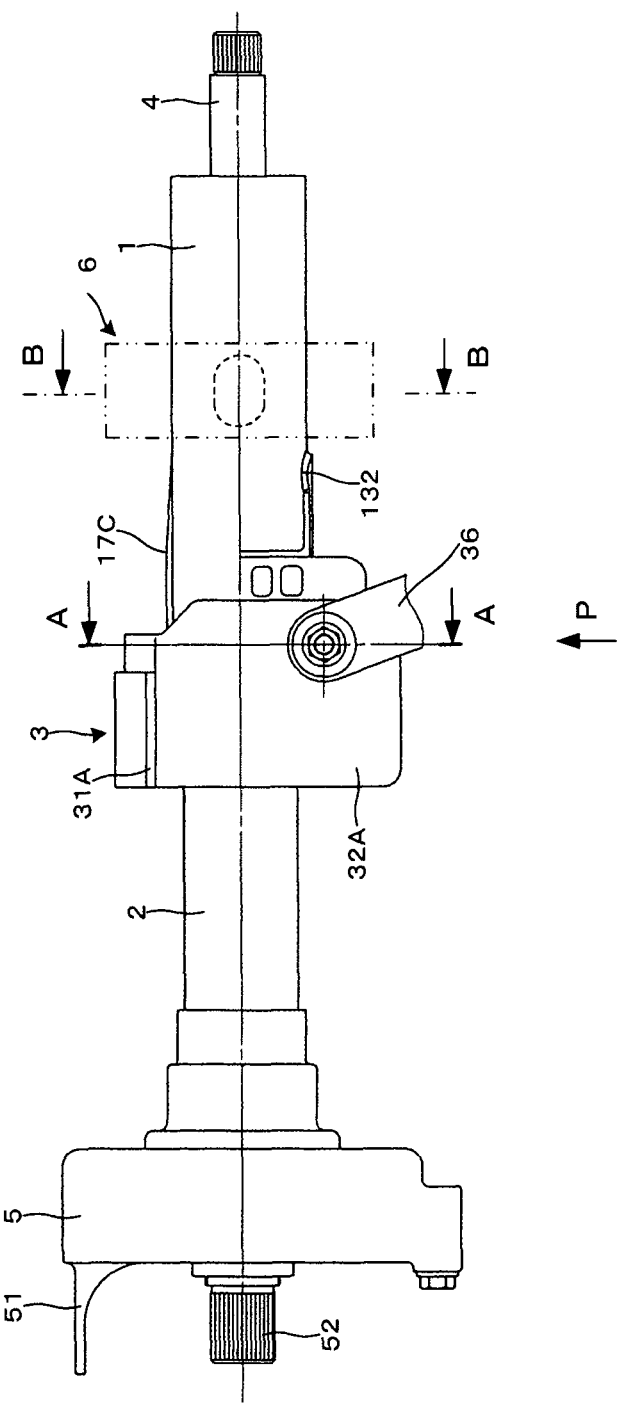
FIG. 1 is an overall side view of a steering column device according to a first embodiment of the present invention, the steering column device being provided with an electric power steering device.

DESCRIPTION OF REFERENCE NUMERALS 1 outer column
101 distance bracket
11A, 11B clamp portion
111A, 111B outer side surface
111, 112, 113, 114, 115 vertical rib
116 upper surface
12A, 12B long slot for telescopic operation
13 slit
131 closed end section
132 semi-circular arc rib
133A, 133B linear rib
134 patch
135, 135A, 135B closed end section
136 open end section
137 parallel section
138A patch
138B rib
139A concave portion
139B, 139C cut
14 end face on the vehicle front side
15A outer peripheral surface
15B inner peripheral surface
16 clamp portion end face
17A, 17B, 17C, 17D, 17E linear rib
18 convex portion
19, 19A closed end section
2 inner column
3 body side upper bracket
31A, 31B flange portion
32A, 32B side plate
33A, 33B circular hole
34 clamping rod
341 head 342 male thread
35 nut
36 telescopic operation lever
4 steering shaft
41 locking groove
5 electric power steering device
51 flange portion
52 output shaft
53 body side lower bracket
6 steering lock device
61 locking pin

BEST MODE FOR CARRYING OUT THE INVENTION

Figure 2:
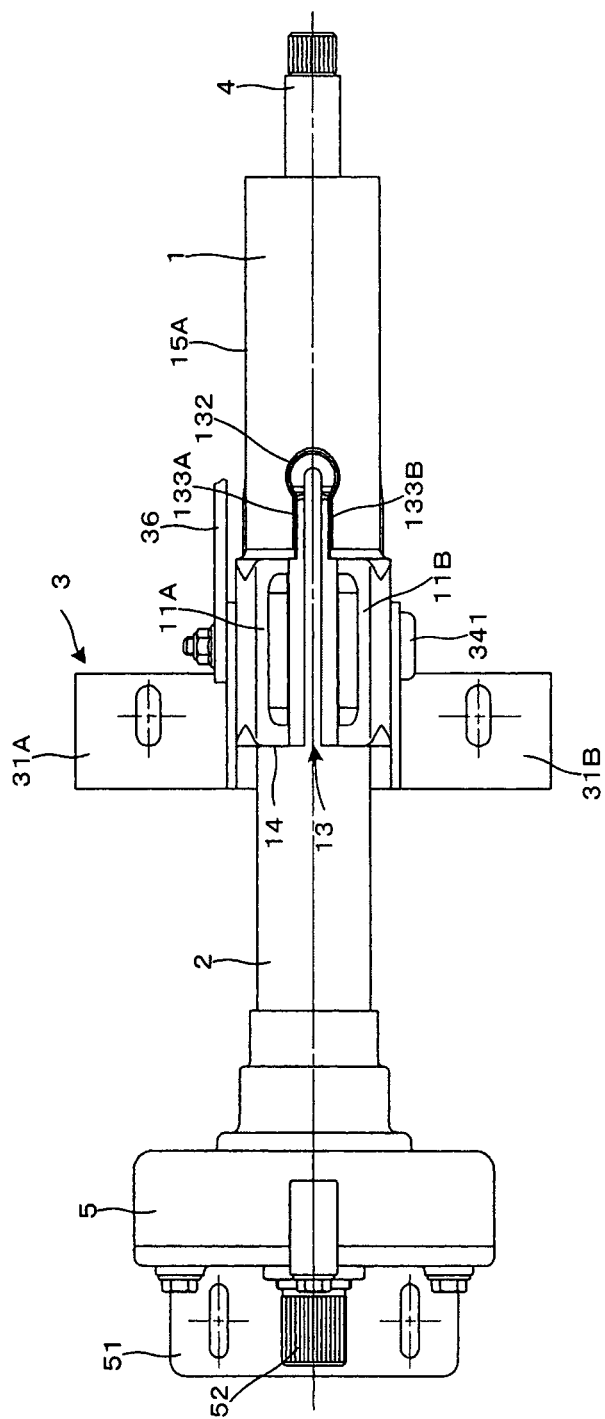
FIG. 2 is a view on arrow P in FIG. 1.
Figure 3:
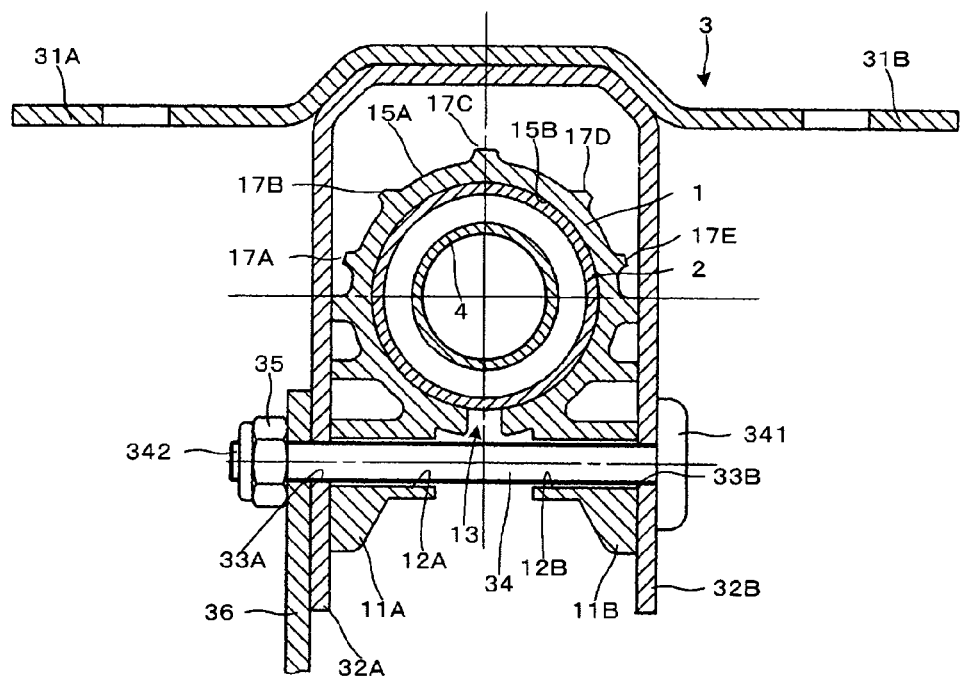
FIG. 3 is a cross-sectional view taken along line A-A in FIG. 1.
Figure 4:
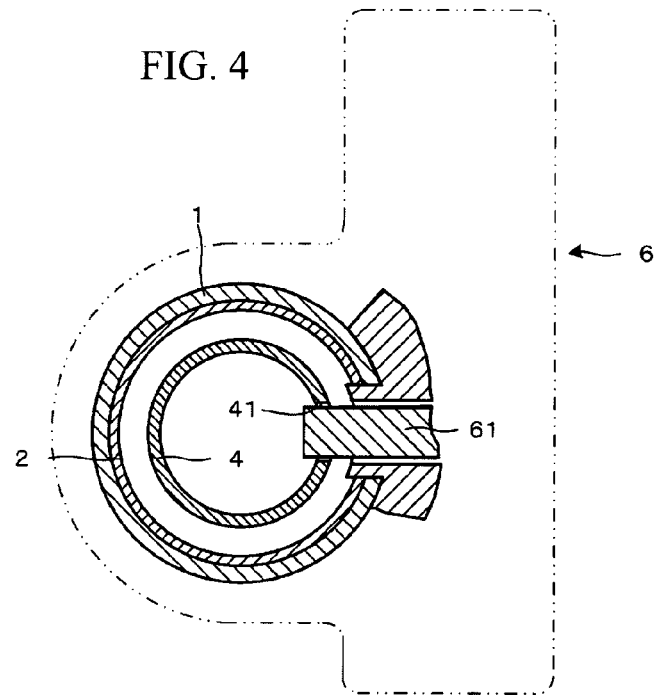
FIG. 4 is a cross-sectional view taken along line B-B in FIG. 1, the view showing a steering lock device.

Embodiments of the present invention will be described in the following with reference to the accompanying drawings. FIG. 1 is an overall side view of a steering column device according to a first embodiment of the present invention. The steering column device according to the first embodiment of the present invention is provided with an electric power steering device. FIG. 2 is a view on arrow P in FIG. 1. FIG. 3 is a cross-sectional view taken along line A-A in FIG. 1. FIG. 4 is a cross-sectional view taken along line B-B in FIG. 1, the view showing a steering lock device.

Figure 5:
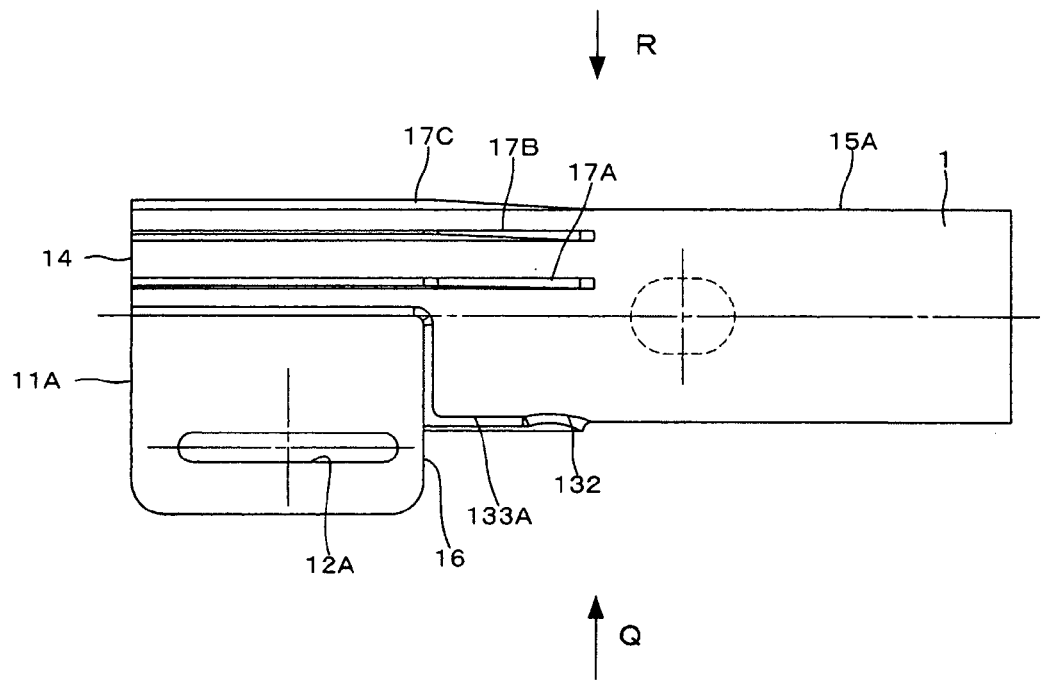
FIG. 5 is a side view of the outer column shown in FIG. 1.
Figure 6:
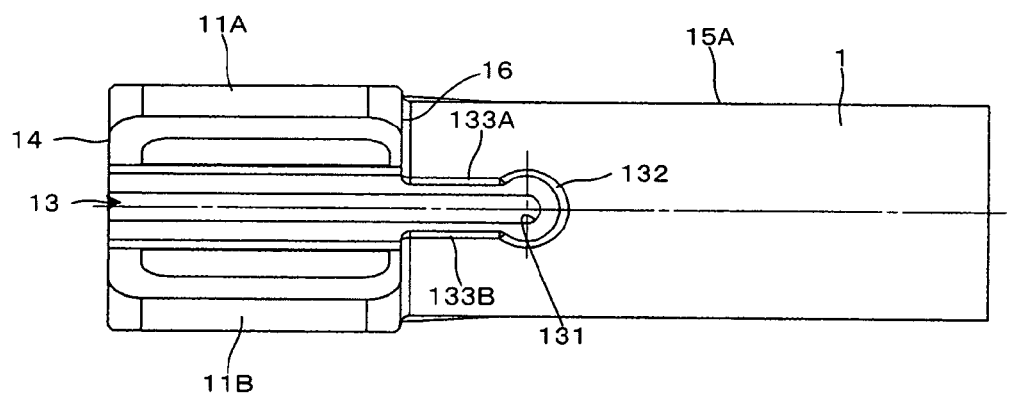
FIG. 6 is a view on arrow Q in FIG. 5, the view showing a bottom view.
Figure 7:
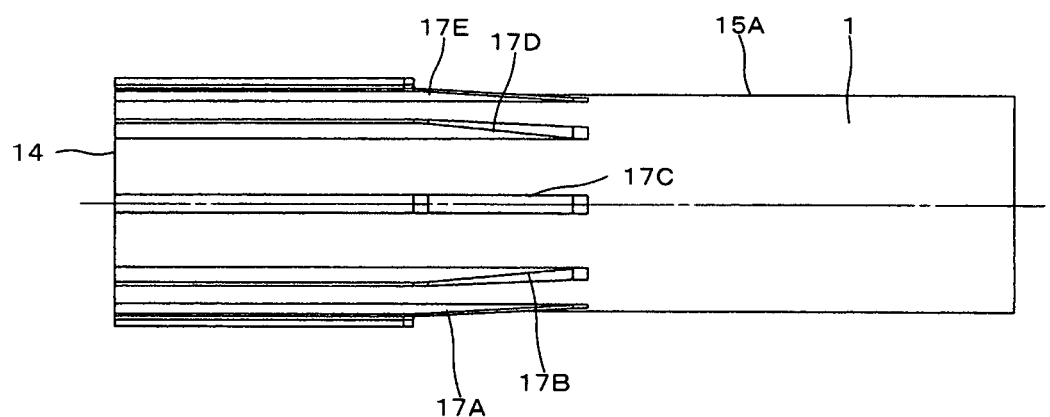
FIG. 7 is a view on arrow R in FIG. 5, the view showing a top view.

FIG. 5 is a side view of the outer column shown in FIG. 1. FIG. 6 is a view on arrow Q in FIG. 5, the view showing a bottom view. FIG. 7 is a view on arrow R in FIG. 5, the view showing a top view. FIGS. 1 to 7 show an embodiment with the present invention applied to a telescopic steering column device. A steering shaft 4 attached with a steering wheel, not shown, positioned on the vehicle rear side (the right side as seen in FIG. 1) is rotatably supported in a hollow cylindrical outer column 1. The outer column 1 is formed by die-casting in which a metal such as an aluminum alloy or a magnesium alloy in a molten state is pressure-injected into a mold. An inner column 2 is axially slidably fitted to an inner peripheral surface 15B on the vehicle front side (the left side as seen in FIG. 1) of the outer column 1. The outer column 1 is fixed to the vehicle body, not shown, by a body side upper bracket 3.

An electric power steering device 5 is mounted on the vehicle front side of the inner column 2. A flange 51 of the electric power steering device 5 is fixed to the vehicle body, not shown. The electric power steering device 5 detects the steering torque of a steering shaft 4, and gives an auxiliary steering force proportional to the steering torque to an output shaft 52.

A pair of left and right flange portions 31A and 31B used to fix the body side upper bracket 3 to the vehicle body are formed in an upper portion of the body side upper bracket 3. Clamp portions 11A and 11B being formed integrally with the outer column 1 and projecting downwardly from the outer column 1 are telescopically movably held between a pair of left and right side plates 32A and 32B extending in the vertical direction of the body side upper bracket 3. The clamp portions 11A and 11B include long slots for telescopic operation 12A and 12B (FIG. 5) extending along the axial direction of the outer column 1. A clamping rod 34 is inserted, from the right side as seen in FIG. 3, through circular holes 33A and 33B formed in the side plates 32A and 32B, respectively, and the long slots for telescopic operation 12A and 12B. The circular holes 33A and 33B may be made long slots so as to make tilting of the outer column 1 adjustable.

As shown in FIG. 3, the clamping rod 34 has a head 341 at its right end. The head 341 abuts against the outer side surface of the side plate 32B. A male thread 342 is formed over a left portion of the clamping rod 34. A nut 35 is screwed onto the male thread 342. A telescopic operation lever 36 is integrally connected to the nut 35, for example, by welding or caulking. A different arrangement may be made such that the clamp portions 11A and 11B project upwardly from the outer column 1 with the clamping rod 34 placed upward of the outer column 1.

Swinging the telescopic operation lever 36 rotates the nut 35 causing the side plates 32A and 32B to be clamped or unclamped via the clamping rod 34. By doing so, the clamp portions 11A and 11B of the outer column 1 can be clamped, at a desired telescopic position, to or unclamped from the body side upper bracket 3. Namely, the outer column 1 can be moved to and clamped at a desired telescopic position by first unclamping it from the body side upper bracket 3, next holding the steering wheel and sliding the outer column 1 in the axial direction relative to the inner column 2, and then clamping the outer column 1 to the body side upper bracket 3.

The outer column 1 is attached with a steering lock device 6 positioned more toward the vehicle rear (toward the right side as seen in FIG. 1) than the clamp portions 11A and 11B. When the vehicle is stopped and the ignition key, not shown, is removed, a locking pin 61 shown in FIG. 4 fits in a locking groove 41 of the steering shaft 4. This locks the steering shaft 4 not to allow it to turn with respect to the outer column 1, and therefore serves as an antitheft measure for the vehicle.

As shown in FIGS. 2, 3, and 6, the outer column 1 has a slit 13 formed through the outer peripheral surface 15A and an inner peripheral surface 15B. The end section on the vehicle front side (the left side as seen in FIGS. 2 and 6) of the slit 13 is open to an end face 14 on the vehicle front side of the outer column 1. At the end section on the vehicle rear side (the right side as seen in FIGS. 2 and 6) of the slit 13, the slit 13 is defined in a semi-circular arc shape, forming a closed end section 131, at an approximately middle portion in the axial direction of the outer column 1.

A substantially semi-circular arc rib 132 radially outwardly projecting from the outer peripheral surface 15A of the outer column 1 is formed at the peripheral edge of the closed end section 131. Furthermore, linear ribs 133A and 133B linearly extend, continuously from the vehicle front side of the semi-circular arc rib 132, toward the vehicle front, reaching a clamp portion end face 16 on the vehicle rear side of the clamp portions 11A and 11B. The linear ribs 133A and 133B radially outwardly project from the outer peripheral surface 15A as much as the semi-circular arc rib 132 does.

The semi-circular arc rib 132 and the linear ribs 133A and 133B reinforce the peripheral edge of the slit 13 of the outer column 1, whose rigidity and strength have been reduced by the formation of the slit 13, so as to enhance the rigidity and strength of the outer column 1. A different arrangement may be made such that the semi-circular arc rib 132 and the linear ribs 133A and 133B radially inwardly project from the inner peripheral surface 15B.

As shown in FIGS. 3, 5, and 7, five circumferentially spaced-apart linear ribs 17A, 17B, 17C, 17D, and 17E are formed on the outer peripheral surface 15A of the outer column 1. The linear ribs 17A to 17E axially extend substantially as long as the slit 13. Namely, the vehicle front side of the linear ribs 17A to 17E axially extend from the end face 14 on the vehicle front side of the outer column 1, and their vehicle rear side substantially extend to an axial position where the closed end section 131 of the slit 13 is formed. The linear ribs 17A to 17E are gradually lower in height toward the vehicle rear until they are flush with the outer peripheral surface 15A of the outer column 1. The linear ribs 17A to 17E may be formed to extend over the entire length in the axial direction of the outer column 1.

The linear ribs 17A to 17E reinforce the outer column 1, whose rigidity and strength have been reduced by the formation of the slit 13, and thereby increase the rigidity and strength of the outer column 1. Thus, the slit 13 causes the outer column 1 to be elastically deformed easily where the slit 13 is formed, enabling the outer column 1 to securely clamp the inner column 2. The semi-circular arc rib 132, the linear ribs 133A and 133B, and the linear ribs 17A to 17E, on the other hand, increase the rigidity and strength of the outer column 1 as a whole. As a result, the steering stability of the steering column device improves and the rigidity of the steering lock device 6 when locking steering also improves.

Trying to forcefully turn the steering wheel when the steering is locked causes the outer column 1 to be subjected to a torsional torque about its axis. The outer column 1 is also enhanced in terms of torsional rigidity and bending rigidity required to withstand such a torsional torque. Even though, in the first embodiment, the inner column 2 is axially slidably fitted to the outer column 1 on the vehicle front side, the inner column 2 may be axially slidably fitted to the outer column 1 on the vehicle rear side.

Figure 8:
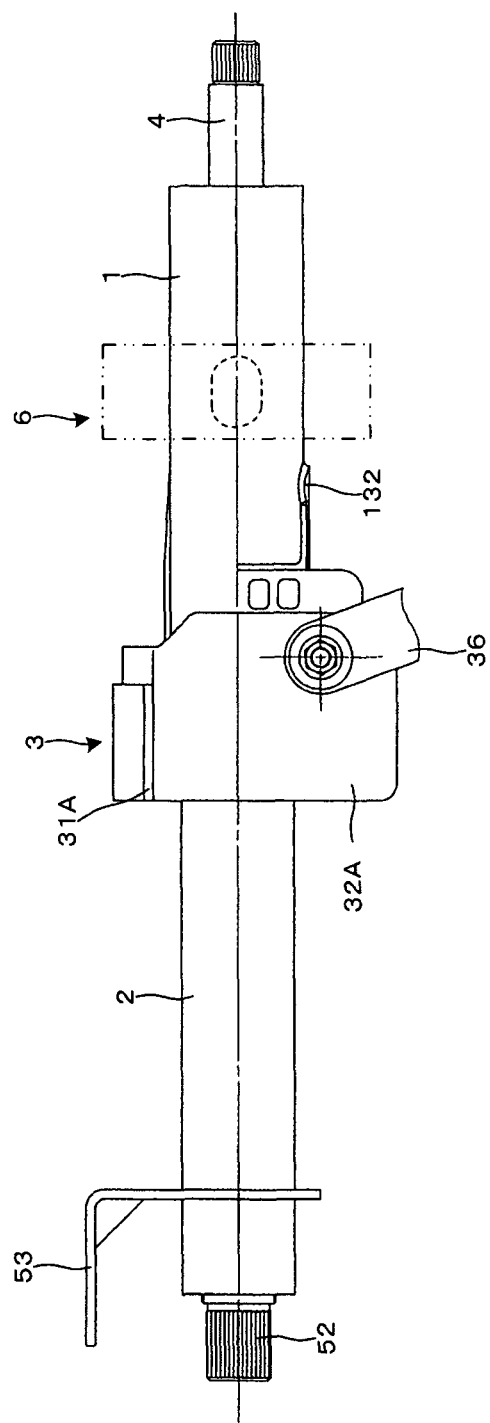
FIG. 8 is an overall side view of a steering column device according to a second embodiment of the present invention, the steering column device being provided with no electric power steering device.

FIG. 8 is an overall side view of a steering column device according to a second embodiment of the present invention. The steering column device according to the second embodiment of the present invention is provided with no electric power steering device. In the following description of the steering column device of the second embodiment, only the portions structured differently from the first embodiment will be covered, and description already made in connection with the first embodiment will not be repeated.

In the steering column device of the second embodiment, a body side lower bracket 53 is attached to the vehicle front side (the left side as seen in FIG. 8) of an inner column 2. The inner column 2 is fixed to the vehicle body, not shown, by the body side lower bracket 53. The slit 13, semi-circular rib 132, linear ribs 133A and 133B, and linear ribs 17A to 17E described for the first embodiment are also provided on the steering column device of the second embodiment, producing the same effects as in the first embodiment.

Figure 9:
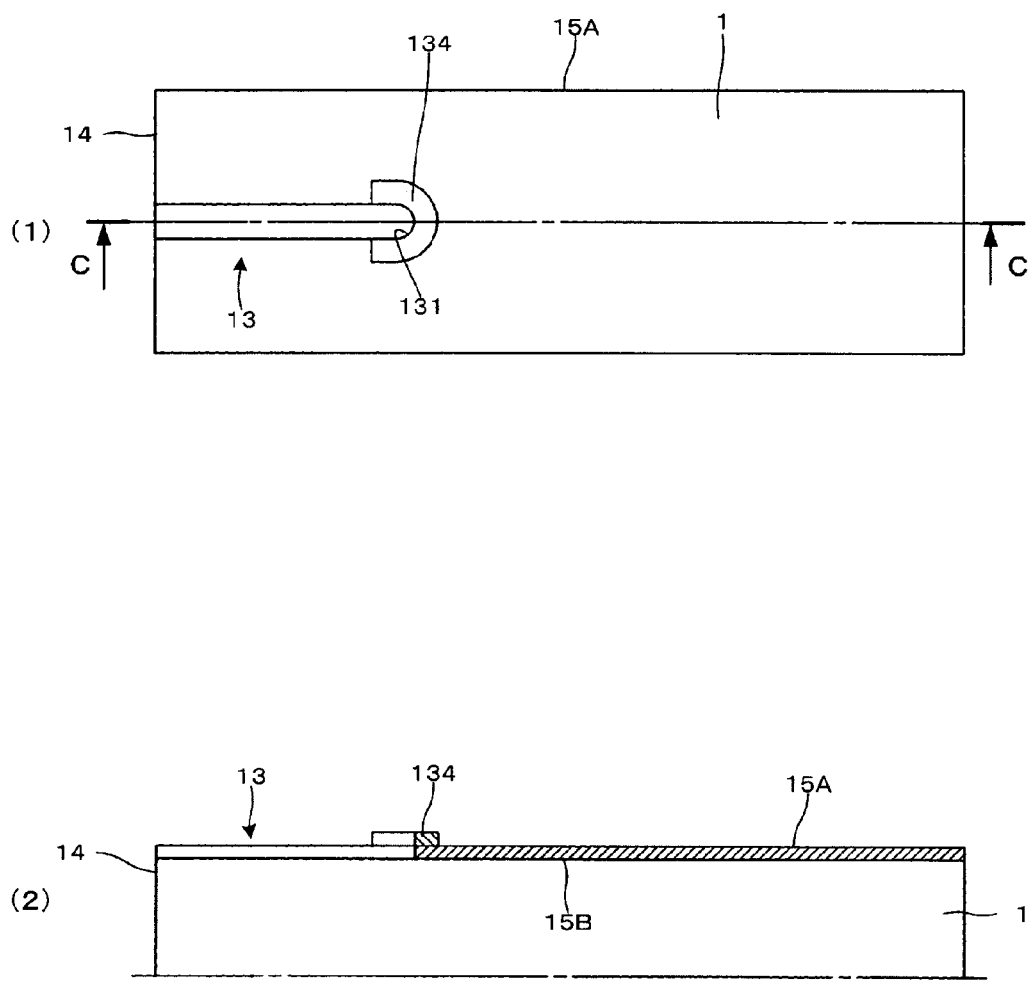
FIGS. 9(1) and 9(2) show an outer column alone of a steering column device according to a third embodiment of the present invention.

FIGS. 9(1) and 9(2) show an outer column alone of a steering column device according to a third embodiment of the present invention. FIG. 9(1) is a bottom view equivalent to FIG. 6 of the first embodiment. FIG. 9(2) is a cross-sectional view taken along line C-C in FIG. 9(1). The outer column 1 of the third embodiment is formed out of a hollow cylindrical steel pipe. In the following description of the steering column device of the third embodiment, only the portions structured differently from the first embodiment will be covered, and description already made in connection with the first embodiment will not be repeated.

The steering column device of the third embodiment includes a substantially semi-circular arc patch 134 welded to the peripheral edge of a closed end section 131 of a slit 13. The semi-circular arc patch 134 reinforces the closed end section 131 where stress most concentrates, and thereby increases the rigidity and strength of the outer column 1. The patch 134 may be welded to an inner peripheral surface 15B of the outer column 1.

Figure 10:
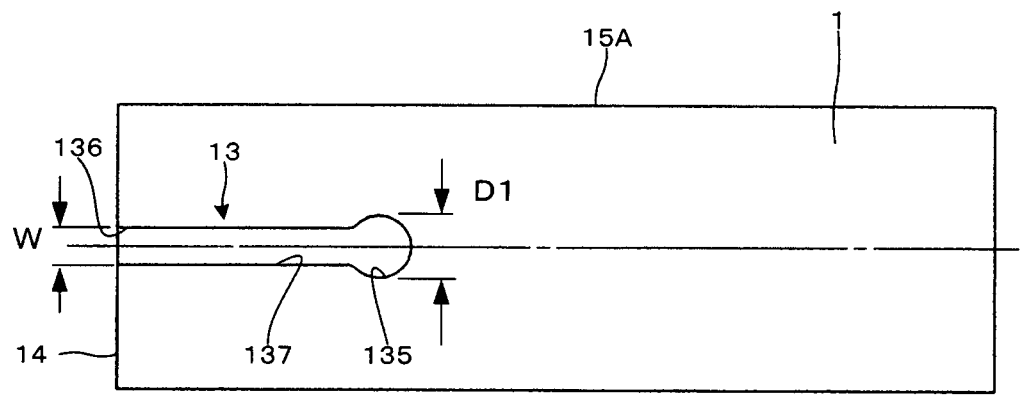
FIG. 10 is a bottom view of an outer column alone of a steering column device according to a fourth embodiment of the present embodiment.

FIG. 10 is a bottom view of an outer column alone of a steering column device according to a fourth embodiment of the present embodiment. As is the case with the third embodiment, the outer column 1 of the fourth embodiment is also formed out of a hollow cylindrical steel pipe. In the following description of the steering column device of the fourth embodiment, only the portions structured differently from the above embodiment will be covered, and description already made in connection with the above embodiment will not be repeated.

In the steering column device of the fourth embodiment, a slit 13 has a semi-circular arc closed end section whose diameter D1 is larger than the width W of an open end section 136 as well as a parallel section 137. Enlarging the width of the closed end section 135 where stress concentrates most reduces the concentration of stress there, and increases the rigidity and strength of the outer column 1.

Figure 11:
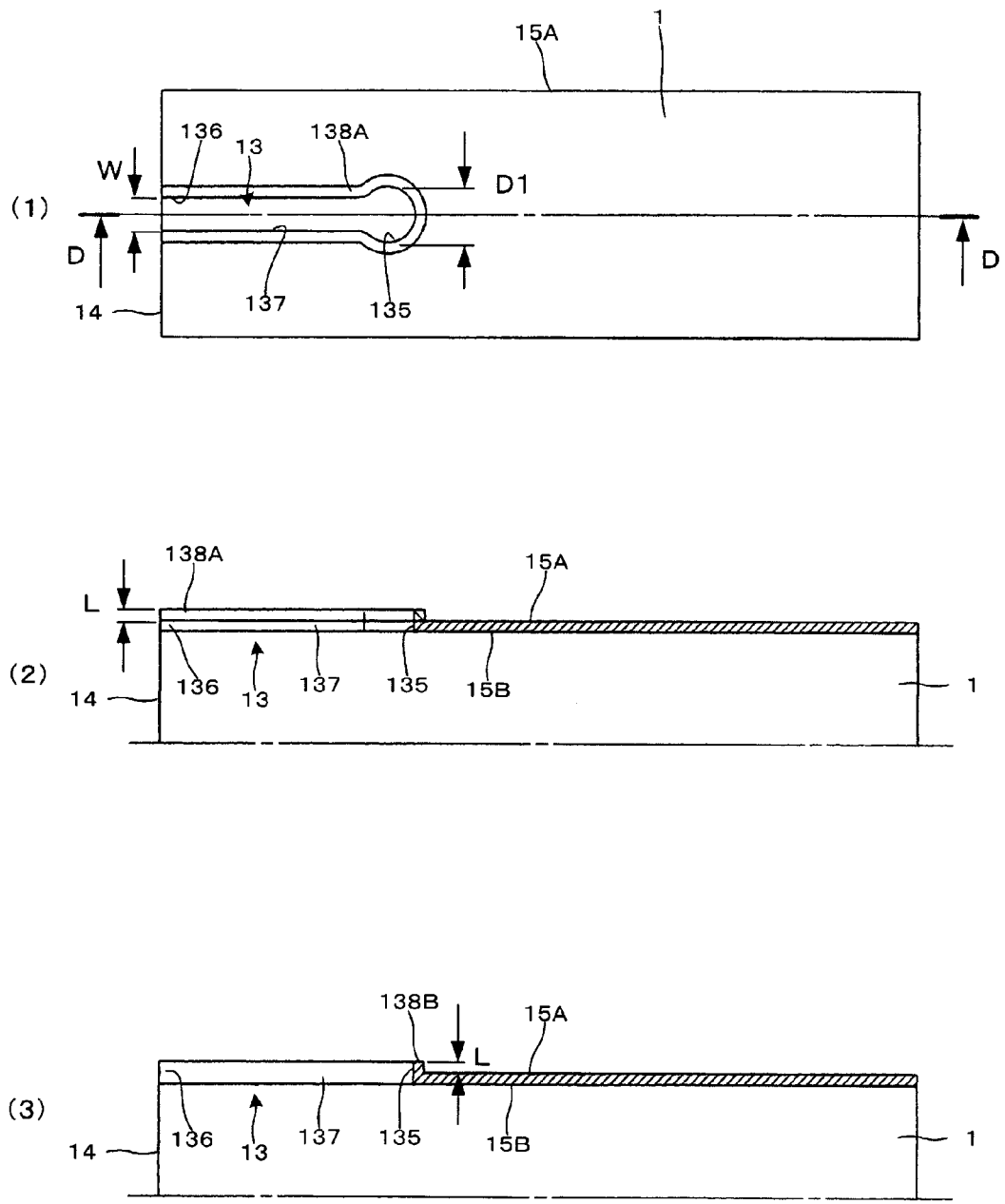
FIGS. 11(1) to 11(3) show an outer column alone of a steering column device according to a fifth embodiment of the present invention.

FIGS. 11(1) to 11(3) show an outer column alone of a steering column device according to a fifth embodiment of the present invention. FIG. 11(1) is a bottom view. FIG. 11(2) is a cross-sectional view taken along line D-D in FIG. 11(1). As is the case with the third and fourth embodiments, the outer column 1 of the fifth embodiment is also formed out of a hollow cylindrical steel pipe. In the following description of the steering column device of the fifth embodiment, only the portions structured differently from the above embodiments will be covered, and description already made in connection with the above embodiments will not be repeated.

In the steering column device of the fifth embodiment, a slit 13 has a semi-circular arc closed end section whose diameter D1 is larger than the width W of an open end section 136 as well as a parallel section 137. Furthermore, a patch 138A is welded to all over the peripheral edge of the slit 13, the patch 138A radially outwardly projecting by a dimension L from an outer peripheral surface 15A of the outer column 1. With the width of the closed end section 135 where stress concentrates most enlarged and the entire peripheral edge of the slit 13 reinforced, the concentration of stress at the closed end section 135 is reduced, and the peripheral edge of the slit 13 is strengthened. As a result, the rigidity and strength of the outer column 1 are increased. The patch 138A may be welded to the inner peripheral surface 15B of the outer column 1.

FIG. 11(3) shows modification to FIGS. 11(1) and 11(2), and is equivalent to a cross-sectional view taken along line D-D in FIG. 11(1). As shown in FIG. 11(3), a rib 138B is formed, by a burring process, all over the peripheral edge of the slit 13, the rib 138B radially outwardly projecting by the dimension L from the outer peripheral surface 15A of the outer column 1. As described with reference to FIGS. 11(1) and 11(2), with the width of the closed end section 135 where stress concentrates most enlarged and the entire peripheral edge of the slit 13 reinforced, the concentration of stress at the closed end section 135 is reduced, and the peripheral edge of the slit 13 is strengthened. As a result, the rigidity and strength of the outer column 1 are increased. The rib 138B may be projecting radially inwardly from the inner peripheral surface 15B of the outer column 1.

Figure 12:
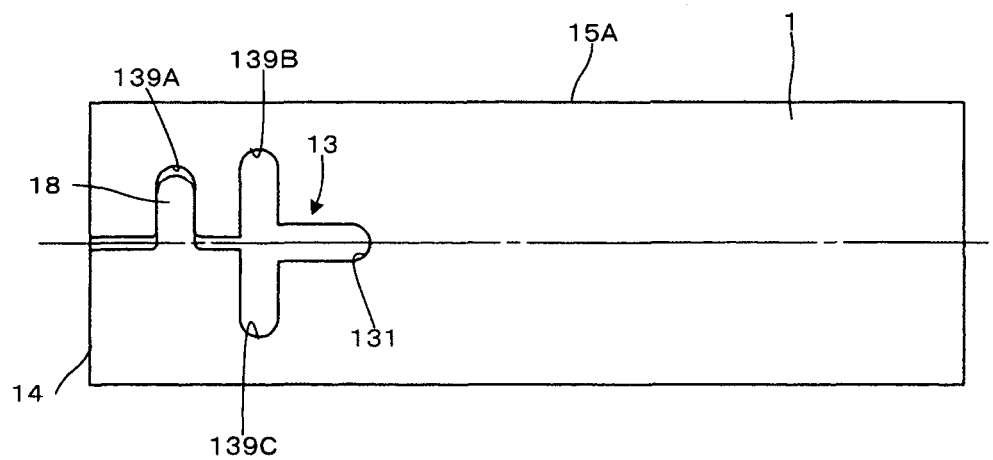
FIG. 12 is a bottom view of an outer column alone of a steering column device according to a sixth embodiment of the present embodiment.

FIG. 12 is a bottom view of an outer column alone of a steering column device according to a sixth embodiment of the present embodiment. As is the case with the third, fourth, and fifth embodiments, the outer column 1 of the fifth embodiment is also formed out of a hollow cylindrical steel pipe. In the following description of the steering column device of the fifth embodiment, only the portions structured differently from the above embodiments will be covered, and description already made in connection with the above embodiments will not be repeated.

In the steering column device of the sixth embodiment, cuts 139B and 139C are provided toward a closed end section 131 of a slit 13 (toward the right side as seen in FIG. 12) perpendicularly to the slit 13. A concave portion 139A and a convex portion 18 are formed toward an end face 14 on the vehicle front side (on the left side as seen in FIG. 12) of the slit 13, the concave portion 139A extending upward perpendicularly from the slit 13 and the convex portion 18 extending downward perpendicularly from the slit 13. The convex portion 18 is raised upwardly (as seen in FIG. 12) to make it fit in the concave portion 139A. This structure increases the rigidity and strength of the outer column 1 against shear stress axially applied to it. The rigidity of the outer column 1 against torsion and bending is also increased.

Figure 13:
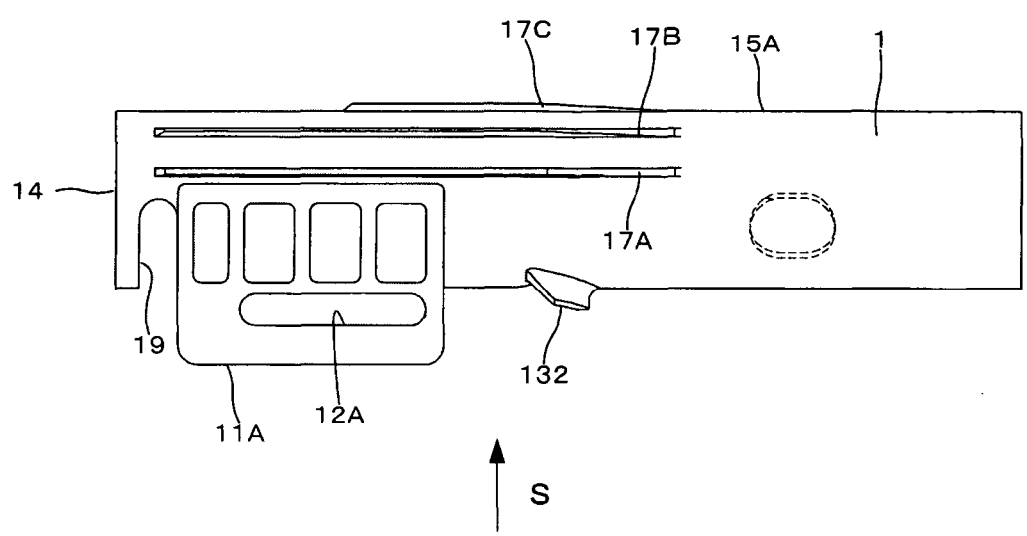
FIG. 13 is a side view of an outer column alone of a steering column device according to a seventh embodiment of the present embodiment.
Figure 14:
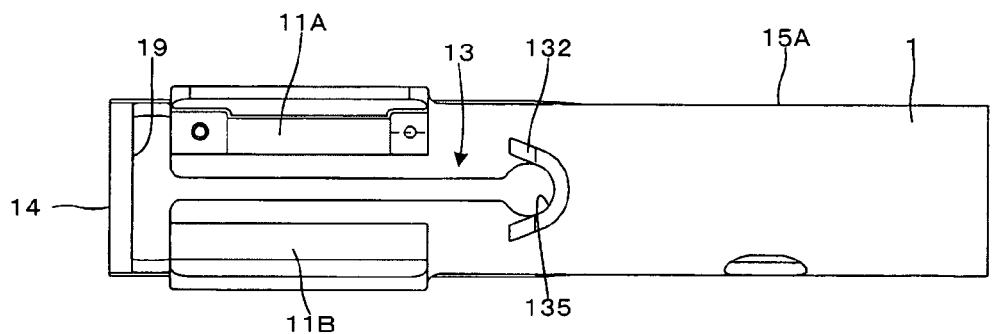
FIG. 14 is a view on arrow S in FIG. 13.

FIGS. 13 and 14 show an outer column alone of a steering column device according to a seventh embodiment of the present invention. FIG. 13 is a side view. FIG. 14 is a view on arrow S in FIG. 13. As is the case with the first embodiment, the outer column 1 of the seventh embodiment is formed by die-casting. In the following description of the steering column device of the seventh embodiment, only the portions structured differently from the above embodiment will be covered, and description already made in connection with the above embodiment will not be repeated.

In the steering column device of the seventh embodiment, an end section on the vehicle front side (the left side as seen in FIGS. 13 and 14) of a slit 13 is not open to an end face 14 on the vehicle front side of the outer column 1. The end section forms a closed end section 19 having a cut perpendicular to the slit 13, the cut substantially reaching, depthwise, the axial center of the outer column 1. The semi-circular arc rib 132, linear ribs 17A to 17E, and the closed end section 135 having a large width described for the first embodiment are also formed in the seventh embodiment, providing the same effects as for the first embodiment. A reinforcement part may be formed around the closed end section 19.

Figure 15:
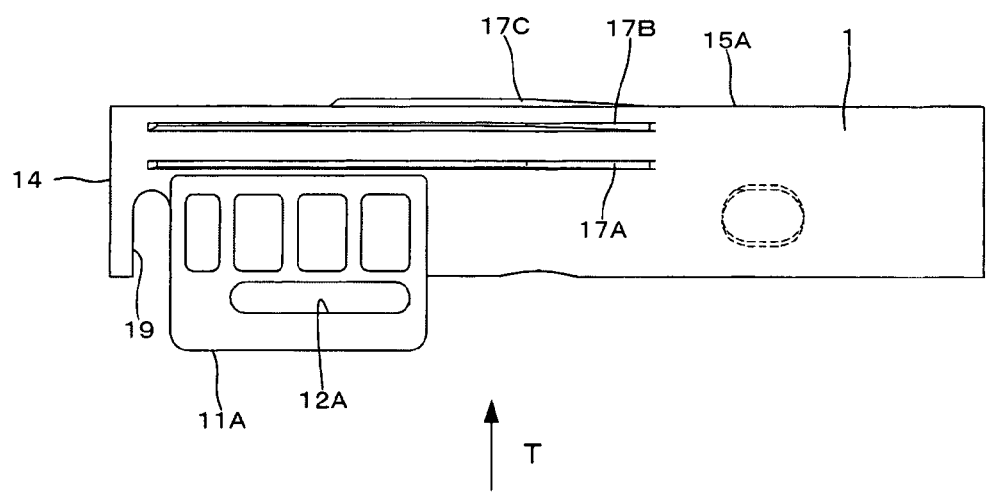
FIG. 15 is a side view showing an outer column alone of a steering column device according to an eighth embodiment of the present invention.
Figure 16:
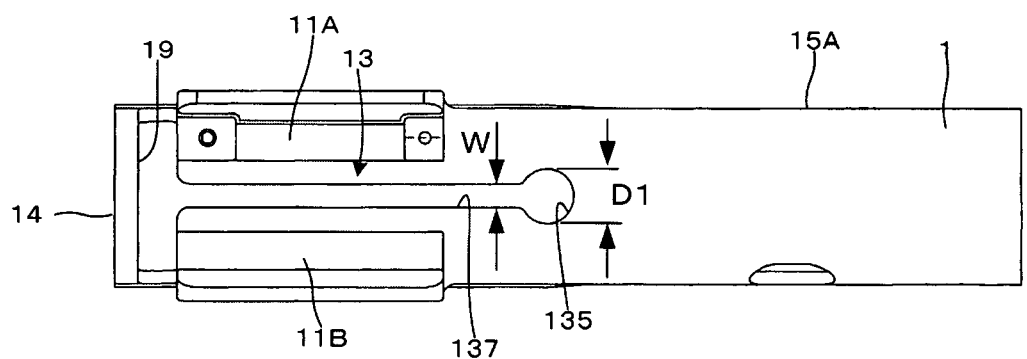
FIG. 16 is a view on arrow T in FIG. 15.
Figure 17:
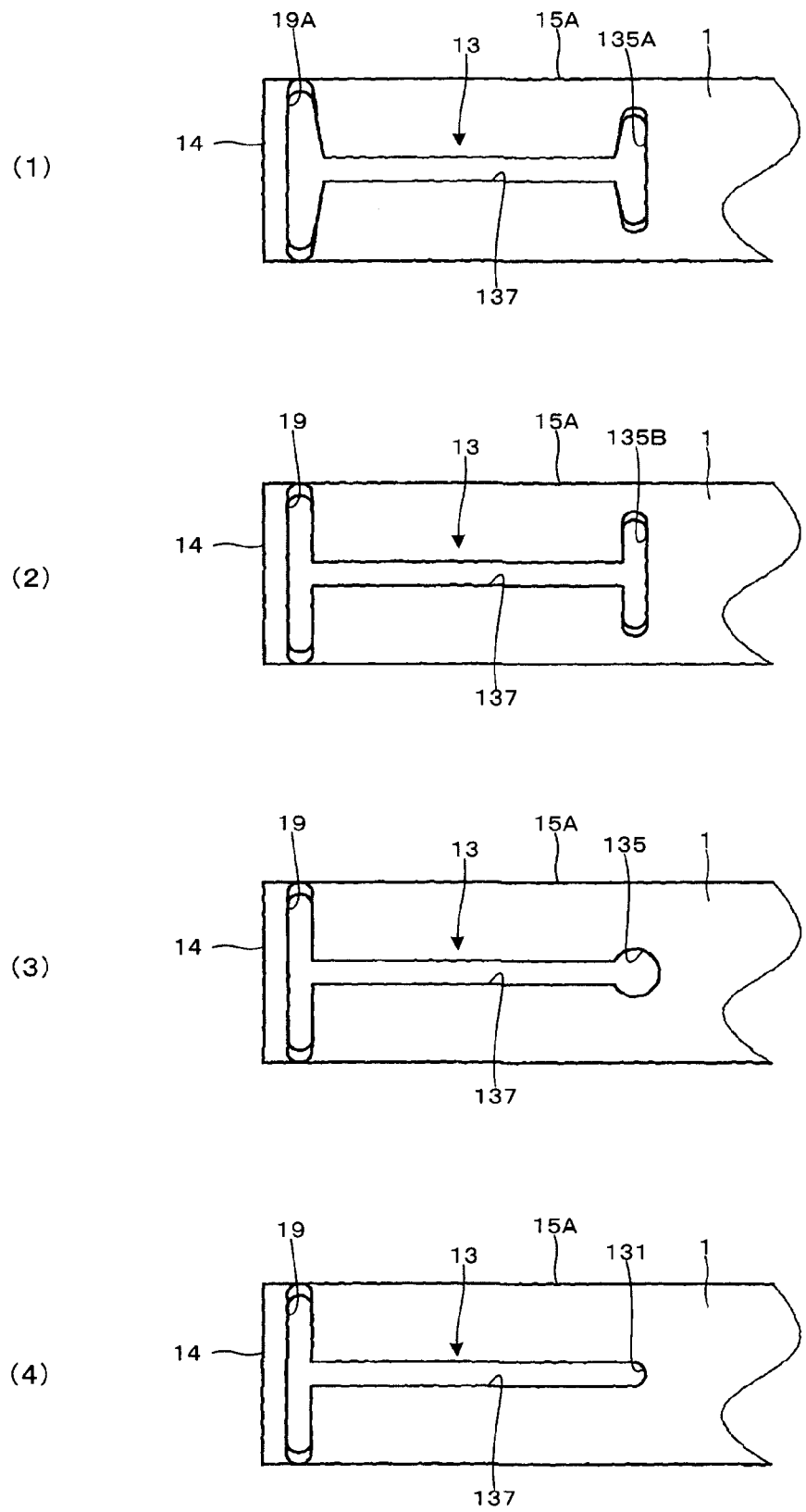
FIGS. 17(1) to 17(4) show examples of modification to closed end sections at both ends of a slit according to an eighth embodiment of the present invention.

FIGS. 15 to 17 show an outer column alone of a steering column device according to an eighth embodiment of the present invention. FIG. 15 is a side view. FIG. 16 is a view on arrow T in FIG. 15. FIGS. 17(1) to 17(4) are outer column bottom views showing examples of modification to closed end sections at both ends of a slit. As is the case with the first embodiment, the outer column 1 of the eighth embodiment is formed by die-casting. In the following description of the steering column device of the eighth embodiment, only the portions structured differently from the above embodiment will be covered, and description already made in connection with the above embodiment will not be repeated.

In conventional steering column devices, an outer column has a slit, one end of which is open to an end face of the outer column. Therefore, when clamping the outer column to a body side upper bracket, the force required to elastically deform the outer column at its slit portion widely varies according to the telescopic position of the outer column (a greater force is required when the telescopic position of the outer column is closer to the closed end section of the slit). This enlarges variation in the force required to operate the telescopic operation lever.

Forming a slit, both ends of which are closed so as to make the variation in the force required to operate the telescopic operation lever smaller, however, increases the force required to elastically deform the outer column, thereby also increasing the force required to operate the telescopic operation lever.

In the steering column device of the eighth embodiment, an end section on the vehicle front side (the left side as seen in FIGS. 15 and 16) of a slit 13 is not open to an end face 14 on the vehicle front side of the outer column 1. The end section forms a closed end section 19 having a cut perpendicular to the slit 13, the cut substantially reaching, depthwise, the axial center of the outer column 1. At the end section on the vehicle rear side (the right side as seen in FIGS. 15 and 16) of the slit 13, the slit 13 is defined in a semi-circular arc shape, forming a closed end section 135, at an approximately middle portion in the axial direction of the outer column 1.

As both ends of the slit 13 are closed, the variation in the force required to operate the telescopic operation lever is small. Furthermore, with the closed end section 19 on the vehicle front side cut depthwise substantially to the axial center of the outer column 1, the force required to elastically deform the outer column 1 is small. Namely, the force required to operate the telescopic operation lever can be held small. With both ends of the slit 1 closed, the outer column 1 is prevented from being deformed while being mechanically processed in an unfinished state. As a result, the variation in the inner diameter of the outer column 1 attributable to deformation caused during mechanical processing is reduced.

The diameter D1 of the semi-circular arc closed end section 135 is larger than the width W of a parallel section 137 of the slit 13. Enlarging the width of the closed end section 135 where stress concentrates most reduces the concentration of stress there. The linear ribs 17A to 17E described for the seventh embodiment are also provided in the eighth embodiment. In the eighth embodiment, however, the semi-circular arc rib 132 described for the seventh embodiment is not provided.

FIGS. 17(1) to 17(4) show examples of modification to closed end sections at both ends of the slit 13. In FIG. 17(1), a closed end section 19A formed on the vehicle front side of the slit 13 is wider perpendicularly toward the slit 13, getting narrower as getting farther perpendicularly from the slit 13. Similarly, a closed end section 135A formed on the vehicle rear side of the slit 13 is also wider perpendicularly toward the slit 13, getting narrower as getting farther perpendicularly from the slit 13.

The closed end section 19A on the vehicle front side substantially reaches, depthwise, the axial center of the outer column 1. The closed end section 135A on the vehicle rear side has a depth smaller than that of the closed end section 19A. To secure required bending strength and rigidity against vibration of the outer column 1, the depth of the closed end section 135A on the vehicle rear side is preferred to be smaller.

In FIG. 17(2), closed end sections 19 and 135B formed on the vehicle front and rear sides, respectively, of the slit 13 each have a constant width. The closed end section 19 on the vehicle front side substantially reaches, depthwise, the axial center of the outer column 1. The closed end section 135B on the vehicle rear side has a depth smaller than that of the closed end section 19.

In FIG. 17(3), a closed end section 19 on the vehicle front side of the slit 13 has a constant width and substantially reaches, depthwise, the axial center of the outer column 1. A closed end section 135 on the vehicle rear side is formed in a semi-circular arc shape having no deeper cut portion. To secure required bending strength and rigidity against vibration of the outer column 1, the closed end section 135 is preferred to have no deeper cut portion.

In FIG. 17(4), a closed end section 19 on the vehicle front side of the slit 13 has a constant width and substantially reaches, depthwise, the axial center of the outer column 1. A closed end section 131 on the vehicle rear side is formed in a semi-circular arc shape whose diameter is equal to the width of the parallel section 137. In the eighth embodiment, the closed end sections 19 and 19A on the vehicle front side and the closed end sections 135A and 135B on the vehicle rear side may be short of reaching, depthwise, the axial center of the outer column 1 or may reach, depthwise, beyond the axial center of the outer column 1.

Figure 18:
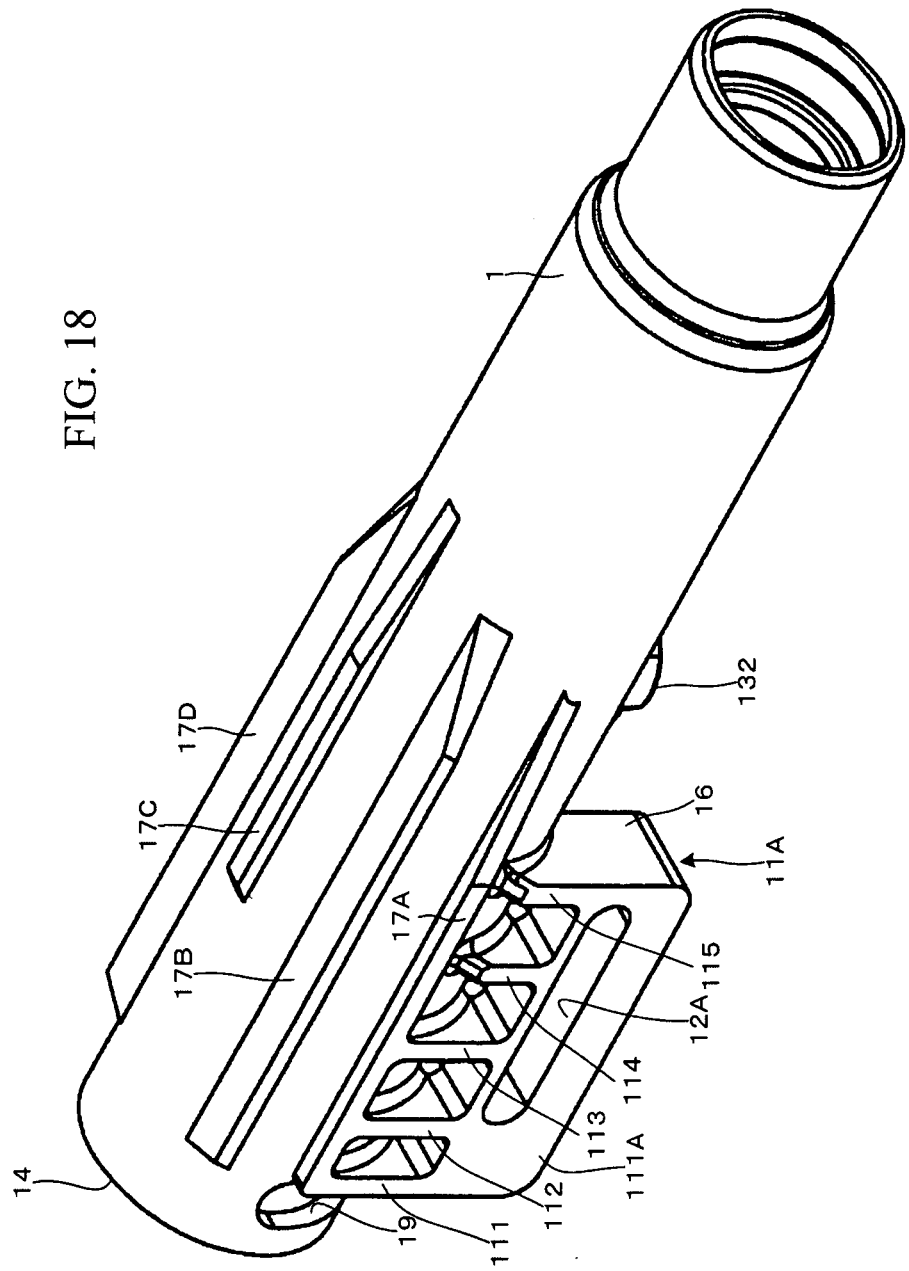
FIG. 18 is a perspective view showing an outer column alone of a steering column device according to a ninth embodiment of the present invention.
Figure 19:
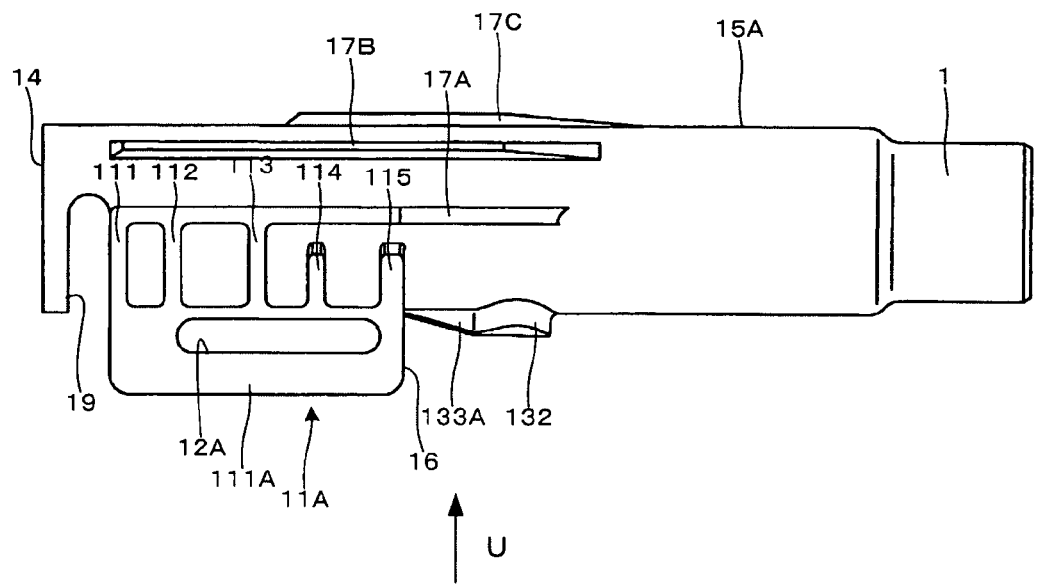
FIG. 19 is a side view of the outer column shown in FIG. 18.
Figure 20:
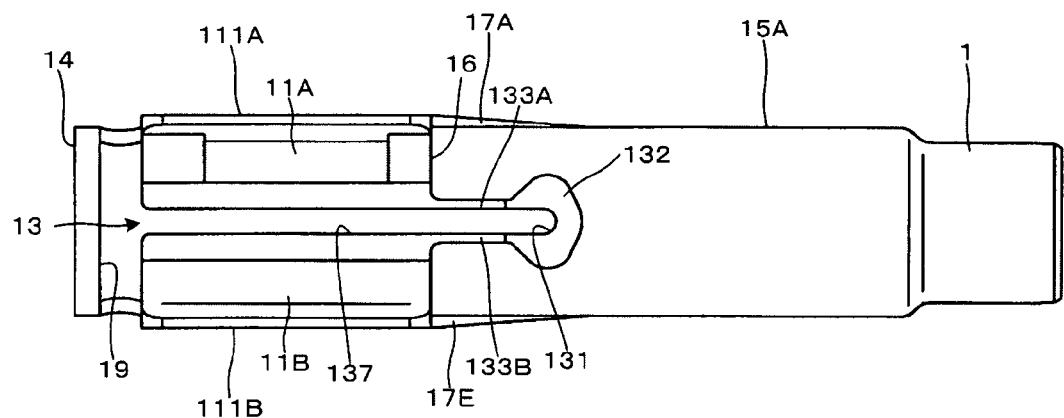
FIG. 20 is a view on arrow U in FIG. 19.

FIGS. 18 to 20 show an outer column alone of a steering column device according to a ninth embodiment of the present invention. FIG. 18 is a perspective view. FIG. 19 is a side view of the outer column shown in FIG. 18. FIG. 20 is a view on arrow U in FIG. 19. As is the case with the first embodiment, the outer column 1 of the ninth embodiment is formed by die-casting. In the following description of the steering column device of the ninth embodiment, only the portions structured differently from the above embodiment will be covered, and description already made in connection with the above embodiment will not be repeated.

In the steering column device of the eighth embodiment, to secure required bending strength and rigidity against vibration of the outer column 1, the closed end section on the vehicle rear side of the slit 3 is made shallower than the closed end section on the vehicle front side of the slit 3. Therefore, when clamping the outer column 1 to the body side upper bracket, the force required to elastically deform the outer column 1 at its slit portion is greater with the outer column 1 at a telescopic position toward the vehicle rear than toward the vehicle front.

In the case of conventional steering column devices having a slit, one end of which in the axial direction is open to an end face of the outer column, too, when clamping the outer column to a body side upper bracket, the force required to elastically deform the outer column at its slit portion is greater with the outer column at a telescopic position toward the closed end section of the slit than toward the open end section of the slit.

Therefore, whether or not one end of a slit formed on an outer column of a steering column device is open to an end face of the outer column, the force required to operate the telescopic operation lever of the steering column device largely varies with the telescopic position of the outer column. As a result, the force clamping the outer column to a body side upper bracket varies according to the telescopic position of the outer column. Variations of the clamping force result in variations of the shock absorption load (EA load) required to move the outer column toward the vehicle front so as to absorb the shock generated at the time of secondary collision.

In the steering column device of the ninth embodiment, an end section on the vehicle front side (the left side as seen in FIGS. 18 to 20) of a slit 13 formed on an undersurface of the outer column 1 is not open to an end face 14 on the vehicle front side of the outer column 1. The end section forms a closed end section 19 having a cut perpendicular to the slit 13, the cut substantially reaching, depthwise, the axial center of the outer column 1. At the end section on the vehicle rear side (the right side as seen in FIGS. 18 to 20) of the slit 13, the slit 13 is defined in a semi-circular arc shape, forming a closed end section 131, at an approximately middle portion in the axial direction of the outer column 1. The diameter of the closed end section 131 is equal to the width of a parallel section 137.

At the peripheral edge of the closed end section 131, a substantially semi-circular arc rib 132 radially outwardly projecting from an outer peripheral surface 15A of the outer column 1 is formed. Furthermore, linear ribs 133A and 133B linearly extend, continuously from the vehicle front side of the semi-circular arc rib 132, toward the vehicle front, reaching a clamp portion end face 16 on the vehicle rear side of the clamp portions 11A and 11B. At end portions on the vehicle rear side of the linear ribs 133A and 133B where they meet the semi-circular arc rib 132, the linear ribs 133A and 133B radially outwardly project from the outer peripheral surface 15A as much as the semi-circular arc rib 132 does. The height of their projection from the outer peripheral surface 15A linearly decreases toward the vehicle front.

In the steering column device of the ninth embodiment, outer side surfaces 111A and 111B of clamp portions 11A and 11B being formed integrally with the outer column 1 and projecting downwardly from the outer column 1 are telescopically movably held between the pair of left and right side plates 32A and 32B of the body side upper bracket 3 shown in FIGS. 1 to 3.

Five circumferentially spaced-apart linear ribs 17A, 17B, 17C, 17D, and 17E are formed, in parallel with the axis of the outer column 1, on the outer peripheral surface 15A of the outer column 1. Of the five linear ribs, four linear ribs 17A, 17B, 17D, and 17E axially extend substantially as long as the slit 13. Namely, the linear ribs 17A, 17B, 17D, and 17E axially extend, on the vehicle front side, from the end faces on the vehicle front side of clamp portions 11A and 11B, and substantially reach, in the axial direction, where the closed end section 131 of the slit 13 is formed.

FIGS. 18 and 19 show, out of the two clamp portions, the clamp portion 11A in detail. Detailed description of the shape of the other clamp portion 11B will be omitted in the following, as the two clamp portions are identical in shape. On the clamp portion 11A, an axially long slot for telescopic operation 12A is formed. As seen in FIG. 19, vertically extending ribs 111 to 115 are formed upward of the long slot for telescopic operation 12A. The vertical ribs 111 to 115 are joined to the outer peripheral surface 15A of the outer column 1, thus being integrated with the outer column 1.

As seen in the side view of FIG. 19, the three vertical ribs 111, 112, and 113 on the vehicle front side are connected to the linear rib 17 formed substantially over the axis of the outer column 1. The two vertical ribs 114 and 115 on the vehicle rear side extend (as seen in FIG. 19) from above the long slot for telescopic operation 12A to be shorter (as seen in FIG. 19) in the vertical direction than the three vertical ribs 111, 112, and 113 on the vehicle front side. Thus, the two vertical ribs 114 and 115 do not reach the linear rib 17A, and there is a gap between the linear rib 17A and the upper end of each of the two vertical ribs 114 and 115. The vertical ribs 111 to 115 need not each be continuous in the vertical direction (as seen in FIG. 19). They may each be divided into plural portions spaced out in the vertical direction (as seen in FIG. 19).

The outer side surfaces of the vertical ribs 111 to 115 and the outer side surface of the linear rib 17A are formed on a same plane as the outer side surface 111A of the clamp portion 11A. Therefore, when the side plates 32A and 32B are clamped by swinging the telescopic operation lever 36 shown in FIG. 3, the outer side surface 111A of the clamp portions 11A and 11B, the outer side surfaces of the vertical ribs 111 to 115, and the outer side surface of the linear rib 17A of the outer column 1 are clamped by the inner side surfaces of the side plates 32A and 32B. Thus, the outer column 1 can be clamped to the body side upper bracket 3 at a desired telescopic position.

Therefore, when the outer column 1 is clamped to the body side upper bracket 3 at a telescopic position on the vehicle front side (i.e., when the clamping rod 34 shown in FIG. 3 is positioned, as seen in FIG. 19, on the left side of the long slot for telescopic operation 12A), the contact area where the inner side surfaces of the side plates 32A and 32B of the body side upper bracket 3 are in contact with the three vertical ribs 111, 112, and 113 on the vehicle front side extends upwardly to well above the slot 13. When the outer column 1 is clamped to the body side upper bracket 3 at a telescopic position on the vehicle rear side (i.e., when the clamping rod 34 shown in FIG. 3 is positioned, as seen in FIG. 19, on the right side of the long slot for telescopic operation 12A), the contact area where the inner side surfaces of the side plates 32A and 32B of the body side upper bracket 3 are in contact with the two vertical ribs 114 and 115 on the vehicle rear side is confined within the vicinity of the slit 13. This increases the bending moment applied to the clamp portions 11A and 11B. As a result, the force required to elastically deform the outer column 1 in its slit portion decreases.

With the closed end sections of the slit 13 shaped as described above, a larger force is required to elastically deform the outer column 1 in its slit portion when the outer column 1 is clamped at a telescopic position toward the vehicle rear than when the telescope position is toward the vehicle front. The contact area where the inner side surfaces of the side plates 32A and 32B of the body side upper bracket 3 are in contact with the outer side surfaces 111A and 111B of the clamp portions 11A and 11B is arranged to be closer to the slit 13 when the telescopic position where the outer column 1 is clamped is toward the vehicle rear than when the telescopic position is toward the vehicle front. This increases the bending moment applied to the clamp portions 11A and 11B when the outer column 1 is at a telescopic position toward the vehicle rear. This reduces the difference in the force required to elastically deform the outer column 1 in its slit portion between when the telescopic position where the outer column 1 is clamped is toward the vehicle front and when the telescopic position is toward the vehicle rear.

Figure 21:
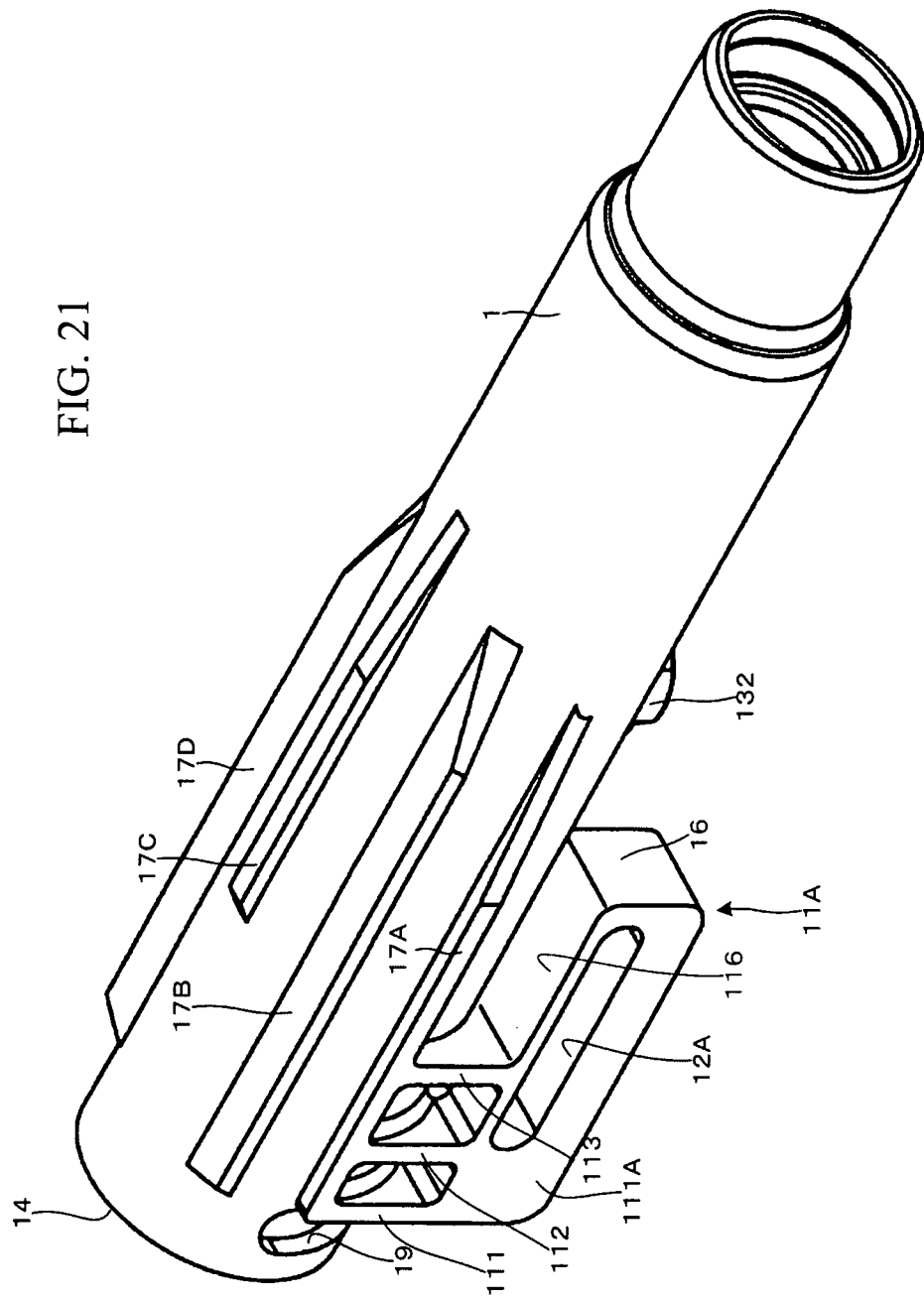
FIG. 21 is a perspective view showing an outer column alone of a steering column device according to a tenth embodiment of the present invention.
Figure 22:
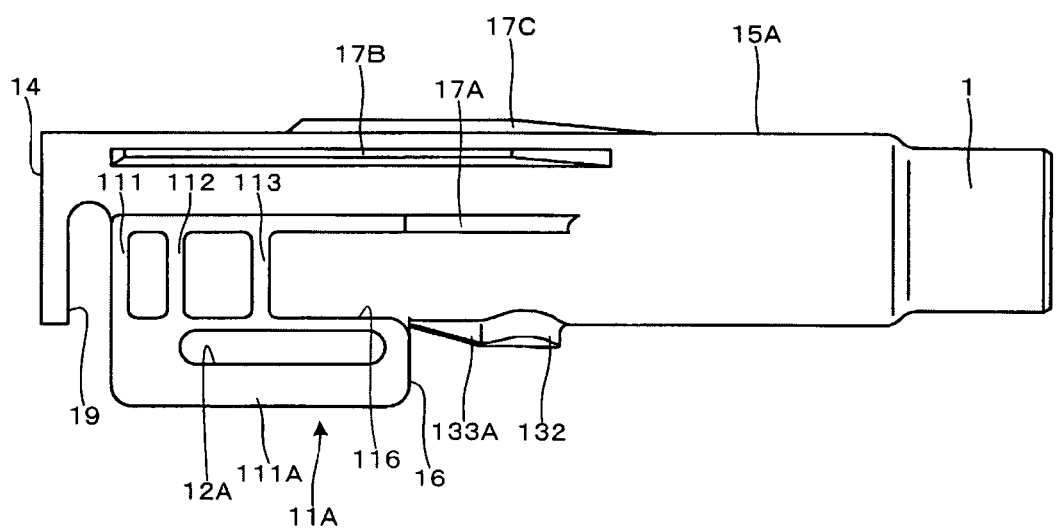
FIG. 22 is a side view of the outer column shown in FIG. 21.

FIGS. 21 and 22 show an outer column alone of a steering column device according to a tenth embodiment of the present invention. FIG. 21 is a perspective view. FIG. 22 is a side view of the outer column shown in FIG. 21. As is the case with the first embodiment, the outer column 1 of the tenth embodiment is formed by die-casting. In the following description of the steering column device of the tenth embodiment, only the portions structured differently from the above embodiment will be covered, and description already made in connection with the above embodiment will not be repeated.

The tenth embodiment is an example of modification to the ninth embodiment. The three vertical ribs 111, 112, and 113 on the vehicle front side provided in the ninth embodiment are also provided in the tenth embodiment. The tenth embodiment differs from the ninth embodiment in that the two vertical ribs 114 and 115 provided in the ninth embodiment are not provided in the tenth embodiment. The space where the two vertical ribs 114 and 115 are formed in the ninth embodiment is unoccupied in the tenth embodiment. In the tenth embodiment, an upper surface 116 of a clamp portion 11A is joined to an outer peripheral surface 15A of the outer column 1.

In this configuration of the tenth embodiment, the shapes of the closed end sections of the slit 13 cause, as in the ninth embodiment, a larger force to be required to elastically deform the outer column 1 in its slit portion when the telescopic position where the outer column 1 is clamped is toward the vehicle rear than when the telescopic position is toward the vehicle front. However, as in the ninth embodiment, the contact area where the inner side surfaces of the side plates 32A and 32B of the body side upper bracket 3 are in contact with the outer side surfaces 111A and 111B of the clamp portions 11A and 11B is arranged to be closer to the slit 13 when the telescopic position where the outer column 1 is clamped is toward the vehicle rear than when the telescopic position is toward the vehicle front. This increases the bending moment applied to the clamp portions 11A and 11B when the outer column 1 is at a telescopic position toward the vehicle rear. This reduces the difference in the force required to elastically deform the outer column 1 in its slit portion between when the telescopic position where the outer column 1 is clamped is toward the vehicle front and when the telescopic position is toward the vehicle rear.

FIGS. 23(1) and 23(2) show an outer column alone of a steering column device according to an eleventh embodiment of the present invention. FIG. 23(1) is a side view. FIG. 23(2) is a view on arrow V in FIG. 23(1). The eleventh embodiment is an example of modification to the ninth and tenth embodiments. The outer column itself of the eleventh embodiment has a welded structure. In the following description of the steering column device of the eleventh embodiment, only the portions structured differently from the above embodiments will be covered, and description already made in connection with the above embodiments will not be repeated.

As shown in FIG. 23, a distance bracket 101 formed by bending a steel plate into a U-shape is welded below an outer peripheral surface 15A of the outer column 1 formed by pressing a steel pipe. Outer side surfaces 110A and 110B of clamp portions 11A and 11B formed on both sides of the distance bracket 101 are telescopically movably held between the pair of left and right side plates 32A and 32B of the body side upper bracket 3 shown in FIGS. 1 to 3.

The outer column 1 has a slit 13 formed through from the outer peripheral surface 15A to an inner peripheral surface 15B. An end section on the vehicle front side (the left side as seen in FIG. 23) of the slit 13 is open to an end face 14 on the vehicle front side of the outer column 1. At the end section on the vehicle rear side (the right side as seen in FIG. 23) of the slit 13, the slit 13 is defined in a semi-circular arc shape, forming a closed end section 135, at an approximately middle portion in the axial direction of the outer column 1.

FIG. 23(1) shows, out of the two clamp portions, the clamp portion 11A in detail. Detailed description of the shape of the other clamp portion 11B will be omitted in the following, as the two clamp portions are identical in shape. The clamp portion 11A has an axially long slot for telescopic operation 12A. The outer side surface 110A of the clamp portion 11A is formed such that its portion above the long slot for telescopic operation 12A has, on the vehicle front side, a length L1 in the vertical direction whereas having, on the vehicle rear side, a length L2 in the vertical direction, the L1 being larger than the L2.

Therefore, when the outer column 1 is clamped to the body side upper bracket 3 at a telescopic position on the vehicle front side, the contact area where the inner side surfaces of the side plates 32A and 32B of the body side upper bracket 3 are in contact with the outer side surface 110A extends upwardly to well above the slot 13. When the outer column 1 is clamped to the body side upper bracket 3 at a telescopic position on the vehicle rear side, the contact area where the inner side surfaces of the side plates 32A and 32B of the body side upper bracket 3 are in contact with the outer side surface 110A is confined within the vicinity of the slit 13. This increases the bending moment applied to the clamp portions 11A and 11B when the telescopic position where the outer column 1 is clamped is on the vehicle rear side. This decreases the force required to elastically deform the outer column 1 in its slit portion.

As a result, as in the ninth and tenth embodiments, the difference in the force required to elastically deform the outer column 1 in its slit portion between when the telescopic position, where the outer column 1 is clamped, is toward the vehicle front and when the telescopic position is toward the vehicle rear, is reduced.

In the above embodiment of the present invention, the outer column 1 is positioned toward the vehicle rear (toward the upper side) to have the outer column 1 held by the body side upper bracket 3. This prevents the outer column 1 from turning, so that no stopper is required between the outer column 1 and the inner column 2. The inner column 2 can therefore be formed in a simple shape. Consequently, the roundness of the inner column 2 can be improved, and the processing cost of the inner column 2 can be reduced.

The invention claimed is:

1. A steering column device, comprising:
an inner column;
a hollow cylindrical outer column axially relatively movably fitted over the inner column and including clamp portions;
a slit formed, over a prescribed axial length, in the outer column;
a clamping device which axially relatively immovably clamps the inner column to the outer column by radially contracting the outer column;
a reinforcement part is provided at a peripheral edge of the slit formed in the outer column, wherein the reinforcement part includes a substantially semi-circular arc rib that projects radially outwardly from an outer periphery of the outer column and first and second linear ribs that extend linearly from respective ends of the semi-circular arc rib to an end face of the clamp portions;
a third linear rib on the outer periphery of the outer column substantially in parallel with the slit, wherein the third linear rib extends substantially as long as the slit and wherein a height of the third linear rib gradually decreases in a direction toward a closed end section the slit.

2. The steering column device according to claim 1, wherein one axial end of the slit is open to an end face of the outer column.

3. The steering column device according to claim 1, wherein a plurality of third linear ribs are angularly spaced-apart on the outer periphery of the outer column.

4. The steering column device according to one of claims 1 and 2, wherein the outer column is formed by die-casting.

5. The steering column device according to one of claims 1 and 2, wherein a steering lock device to lock a steering wheel is attached to at least one of the outer column and the inner column.

6. A steering column device, comprising:
a body side upper bracket mountable on a vehicle body;
an inner column;
a hollow cylindrical outer column which is fitted over the inner column such that a telescopic position of the outer column is axially adjustable and which is axially supported by the body side upper bracket;
a slit formed, over a prescribed axial length, in the outer column; and
a clamping device which can axially relatively unmovably clamp the inner column to the outer column by clamping, with side plates of the body side upper bracket, two clamp portions formed on the outer column and thereby causing the outer column to be elastically deformed and radially contracted in a slit portion thereof, wherein each of the two clamp portions has an axial slot, a first length in a vertical direction on a first side of a respective clamp portion and a second length in the vertical direction on a second side of the respective clamp portion, wherein the first length is greater than the second length, wherein the first and second lengths are measured on the respective clamp portion, and wherein the vertical direction is perpendicular to the axial slot of the respective clamp portion,
wherein a contact area between the side plates of the body side upper bracket and the two clamp portions is changeable according to the telescopic position of the outer column.

7. The steering column device according to claim 6,
wherein a closed end section which is not open to an axial end face of the outer column is formed at each axial end of the slit,
and wherein a cut perpendicular to the slit is formed in at least one of the closed end sections.

* * * * *